United States Patent [19]

Apostoleris

[11] 3,794,869

[45] Feb. 26, 1974

[54] DYNAMOELECTRIC MACHINE END PLATE AND MOUNTING MEANS

[75] Inventor: Theodore G. Apostoleris, Ann Arbor, Mich.

[73] Assignee: Ford Motor Company, Dearborn, Mich.

[22] Filed: Nov. 15, 1972

[21] Appl. No.: 306,778

[52] U.S. Cl. .................................................. 310/90
[51] Int. Cl. ............................................ H02k 5/16
[58] Field of Search.... 310/90, 89, 43, 91, 239, 242

[56] References Cited
UNITED STATES PATENTS

| | | | |
|---|---|---|---|
| 3,529,874 | 9/1970 | Hoddy | 310/89 |
| 3,145,313 | 8/1964 | Tupper | 310/90 |
| 3,343,016 | 9/1967 | Lewis | 310/90 |
| 3,483,409 | 12/1969 | Phillips | 310/90 |
| 3,714,705 | 2/1973 | Lewis | 310/89 |
| 3,525,891 | 8/1970 | Lukawich | 310/239 |
| 2,819,417 | 1/1958 | Glass | 310/90 |

FOREIGN PATENTS OR APPLICATIONS

| | | | |
|---|---|---|---|
| 237,094 | 11/1964 | Austria | 310/43 |

Primary Examiner—R. Skudy
Attorney, Agent, or Firm—Robert A. Benziger; Keith L. Zerschling

[57] ABSTRACT

A bearing retaining unitary plastic end plate for a dynamoelectric machine is disclosed. The end plate includes a through passage for receipt of the normally provided armature bearing and armature bearing retaining means. In order to accommodate placement of the dynamoelectric machine so that the axis of rotation of the armature may be at or near the vertical, the through passage is provided with a discontinuous ridge for receipt of resilient fingers extending from the bearing retaining means. This ridge is formed by providing a plurality of passages extending part-way through the end plate structure parallel to the axis of the through passage and intersecting the through passage in the vicinity of bearing retaining means. The end plate structure is also formed with a pair of molded, opposed wire retaining clip members for receiving any internal wiring and preventing that wiring from entering the brush/commutator interface. A resilient clip means is provided for mounting the end plate structure on the housing of the dynamoelectric machine while providing central support for the end plate.

8 Claims, 4 Drawing Figures

DYNAMOELECTRIC MACHINE END PLATE AND MOUNTING MEANS

CROSS REFERENCE TO RELATED APPLICATION

This application is related to co-pending commonly assigned patent application Ser. No. 223,636, filed on behalf of Arthur G. Macoit and Theodore G. Apostoleris entitled "Permanent Magnet Dynamoelectric Machine" filed Feb. 4, 1972.

BACKGROUND OF THE INVENTION

1. Field of the Invention

The present invention is related to the field of dynamoelectric machines and in particular to that portion of the above noted field in which the housing structure of the dynamoelectric machine comprises molded plastic housing structure. In particular, the present invention is directed to that portion of the above noted field which is devoted to bearing retaining end plate structures and mounting means.

2. Description of the Prior Art

It is known in the art to provide a molded plastic unitary housing for a dynamoelectric machine. Such housings are adapted to receive one end of the rotor or armature while the other end of the rotor or armature is received in an end plate structure thereafter secured to the housing. The above noted co-pending application illustrates such an arrangement in which the end plate structure was secured by threaded fasteners received within threaded holes provided therefor in the plastic housing structure. The end plate there illustrated comprises perforated plate-like structure including a bearing retention means to which was added the normally provided brush card which includes the means for receiving the electric brushes and maintaining them in contact with the commutator of the armature. The particular structure was originally conceived to be of composite construction using existing components but resulted in an increase in material cost and also resulted in an increase in the cost of assembly. In order to further realize the benefits of the plastic housing structure, it is desirable to realize the end plate structure of molded plastic material.

The realization of end plate structure in a molded plastic form which is functionally identical with the structure illustrated in the above noted co-pending application is relatively easy in that the formation of the end plate with the electrical brush receiving receptacles and oil catcher in place and having the requisite shapes and relationships of sizes can be accomplished in a single molding step. Such a plastic structure results necessarily in the formation of a through passageway having a minimum diameter at the orifice facing the armature, that is, on the side of the end plate including the brush receptacles, and having either a constant or increasing diameter for the length of the passageway. This results in a requirement for the armature supporting bearing structure to be inserted from the non-armature side of the end plate which must then be backed up by a bearing retention means. Such an arrangement is relatively common and bearing structure and bearing retention means for such purposes are known. However, the realization of the end plate structure in a unitary molded plastic form when combined with a mounting arrangement placing the axis of rotation of the armature at or near the vertical results in the bearing retaining means being required to support, within a smooth plastic bore in the end plate structure, the entire weight of the armature. Such an arrangement is failure prone. It is, therefore, a principal object of the present invention to provide a unitary molded plastic end plate structure including means for receiving, and providing axial support for, a bearing retaining means. In order to preserve and realize the full benefits of utilizing a molded plastic end plate structure, it is a further object of the present invention to provide such a retention mechanism within the end plate which does not require further operational steps to be added to the normal plastic molding process.

A further problem which results when a dynamoelectric machine with the end plate structure realized in molded plastic form and assembled according to the teachings of the above noted co-pending application is mounted with the axis of the armature at or near the vertical resides in the fact that the full weight of the armature is applied centrally of the end plate while the end plate is supported peripherally. While all structures are deformable to a certain extent, plastics are generally more deformable than the normal end plate materials and any deflection observed in this mode of operation results in a nonoptimum relationship between the armature windings and the field structure. It is, therefore, a further object of the present invention to provide means for mounting the end plate structure to the housing which means operates centrally of the end plate. A further difficulty with relying upon threaded screw passages within the housing structure resides in the fact that the formation of such passages within a molded plastic housing structure is a relatively difficult and expensive molding technique and complicates assembly and servicing. It is, therefore, a more specific object of the present invention to provide a means for coupling the end plate structure to the main housing which does not rely upon threaded screw fasteners and which facilitates assembly and servicing.

SUMMARY OF THE PRESENT INVENTION

The present invention provides a unitary plastic end plate structure for a dynamoelectric machine having a plurality of generally axially directed, radially spaced, circumferentially equidistant passageways formed through a portion of the end plate and arranged to intercept the main axial bore to provide therein a discontinuous radially directed surface for receiving the resilient fingers of a bearing retaining means. This permits the bearing retaining means to directly abutt a radially directed surface in order to adequately support any vertical loading on the bearing retaining means occasioned by mounting of the dynamoelectric machine with its axis of rotation at or near the vertical. To further provide support and to ease assembly and servicing, a resilient clip means is provided to couple the end plate to the housing structure while centrally supporting the end plate. The end plate is further provided with means forming a brush receiving and retaining channel or passageway and with means forming a plurality of oppositely directed circumferentially spaced L-shaped retainers for receiving and retaining brush lead wires.

DETAILED DESCRIPTION OF THE PREFERRED EMBODIMENT

Figure 1:
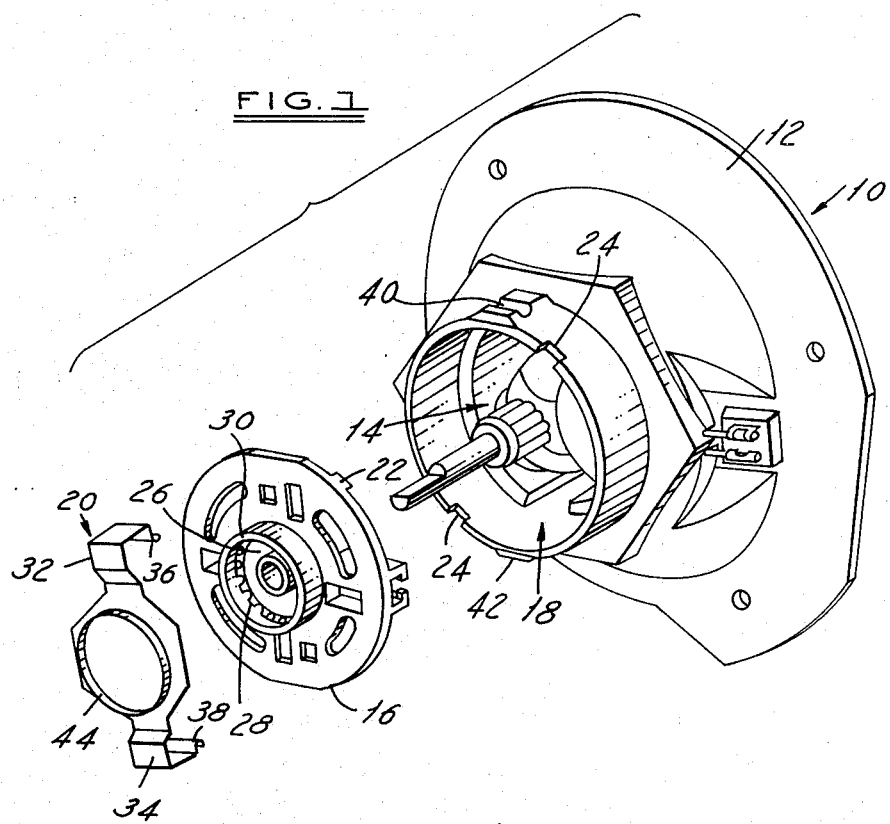
FIG. 1 shows a partially exploded perspective view of an end plate structure according to the present invention for a dynamoelectric machine having a unitary housing structure.

Referring now to the FIGS. wherein like numbers in the various FIGS. designate corresponding structure, FIG. 1 illustrates a dynamoelectric machine 10 in a partially exploded perspective view. Machine 10 includes a housing structure 12 centrally located within which is a rotor or armature structure 14. End plate structure 16 is received by the open end 18 of the housing structure 12 and secured in place by clip means 20. In order to locate the end plate 16, it is provided with projecting ears 22 which are received within suitably provided slots 24 in the open end 18 of the housing 12. Bearing retention means 26 are illustrated in position within end plate structure 16 and are provided with a plurality of resilient fingers 28 to engage the interior surface of the bore within which the bearing retention means is located. End plate 16 is also provided with an axially projecting circular flange or shoulder 30.

Clip means 20 includes resilient, equidistantly spaced extending arm portions 32 and 34 with end portions 36 and 38 for receipt within suitably provided seating means 40 and 42 of the housing structure 12. The central portion 44 of the clip means 20 is comprised of a collar member which is sized to surround the extending flange or shoulder 30 of the end plate structure 16. Flange 30 and collar 44 cooperate to locate the clip means 20 centrally of the end plate 16.

Figure 2:
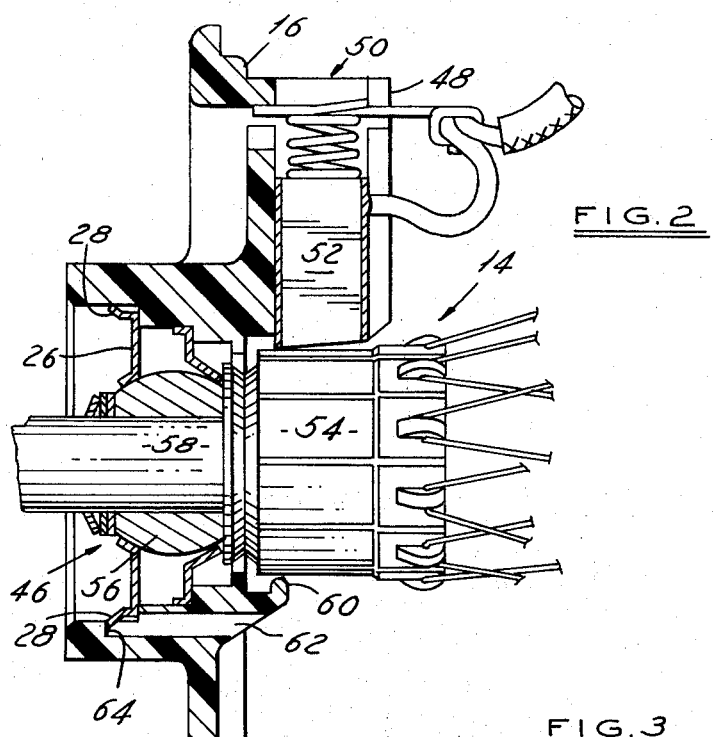
FIG. 2 illustrates a sectional view, taken along line 2—2 in FIG. 3, of the end plate according to the present invention and includes a partial elevational view of an armature received within the end plate.
Figure 3:
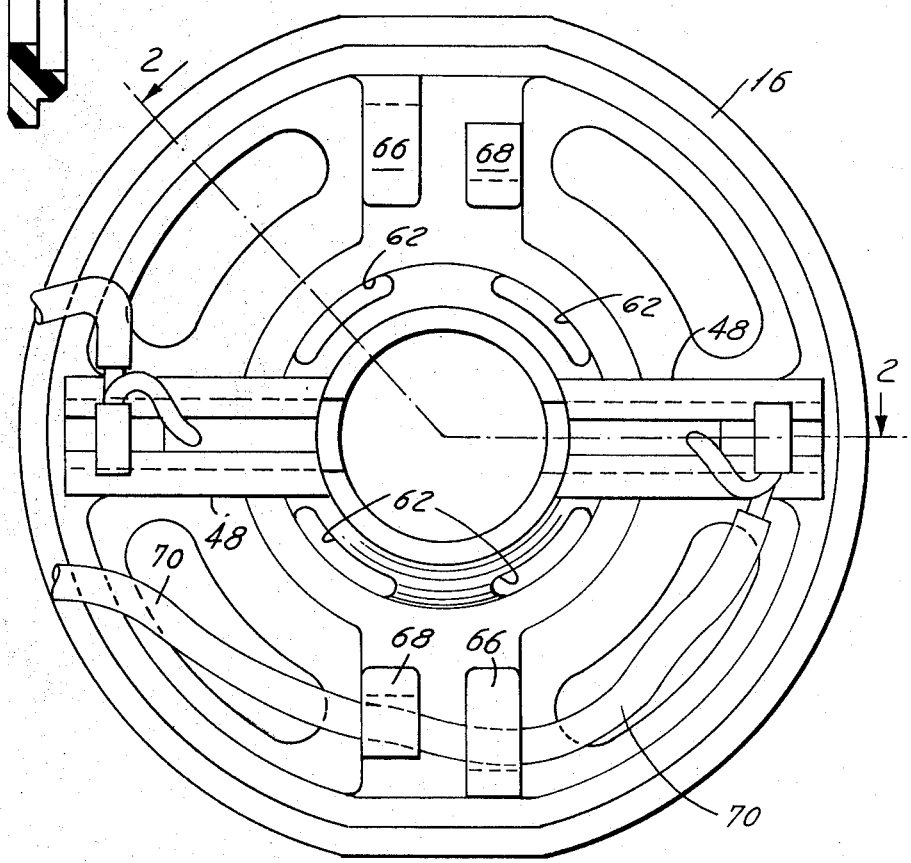
FIG. 3 illustrates the end plate according to the present invention in an armature side or rear elevational view.

Referring now to FIGS. 2 and 3, the end plate according to the present invention is illustrated in a rear elevational view (FIG. 3) and in a sectional view (FIG. 2) with the section taken along the line 2—2 in FIG. 3. End plate 16 is illustrated as a unitary structure formed of a molded plastic material. This structure includes a through passage or bore 46 extending through the central portion of the end plate structure 16 and having an axis which is substantially coincident with the axis of rotation of the dynamoelectric machine 10. To aid in an understanding of the relationship of the end plate of the instant invention to a dynamoelectric machine, FIG. 2 also shows, in elevation, a portion of an armature structure 14 of a dynamoelectric machine. End plate structure 16 includes a pair of molded brush retaining means 48 each of which is comprised of a pair of facing L-shaped members arranged to form a substantially rectangular passage or channel 50. Electrical brushes 52 of known construction are received within the channels 50. Resilient means are provided to bias the brushes 52 into contact with the commutator setion 54 of the armature 14. Bearing means 56 are positioned within the passage 46 to rotatably support the shaft 58 of the armature means 14. Bearing retention means 26 are operative to retain the bearing means 56 within the bore 46. As can readily be observed in FIG. 2, the end plate 16 can be molded to include an oil catcher, in the form of circular lip 60, for bearing means 56 without requiring this structure to be added as a separate component. However, lip 60 also defines the minimum diameter for passage or bore 46 necessitating insertion of bearing retaining means 26 from the opposite side.

As illustrated in FIGS. 1 and 2, the bearing retention means 26 are provided with a plurality of radially extending fingers 28 positioned around the periphery thereof. Due to the fact that unitary plastic structure of the end plate 16 is of necessity provided with intricate structure in the form of the brush receiving means 48, oil catcher 60 and the wire clip means to be described hereinbelow (with reference to FIG. 4) in the vicinity of the commutator means 54, the plastic molding process requires that the diameter of the passage or bore 46 be constant or increasing as the axial distance from the commutator 54 increases. This results in the bearing retention means 26 being provided with a relatively smooth wall section of the bore which cannot readily be provided with a surface to facilitate gripping thereof by the resilient spring fingers 28. It will be appreciated that placement of the dynamoelectric machine 10 with its axis of rotation in a substantially vertical direction will result in gravity loading of the bearing retention means 26.

In order to accomplish the purposes of the instant invention, the end plate structure 16, having a through passageway 46 of increasing diameter as the axial distance from the commutator increases, is provided with a plurality of generally axially directed channels or passageways 62 equidistantly spaced about the axis of the bore 46 and spaced a radial distance therefrom which will provide for their intersection with the larger diameter section of the passage 46 in the vicinity of the bearing retaining means 26. Passages thus directed can be readily formed during the molding step in the production of an end plate 16 and when spaced as stated above readily provide a discontinuous radially directed surface 64 which is positioned to receive at least some of the spring fingers 28. This permits the gravity loading of the bearing retaining means 26 to be directly received by a suitable ridge formed within the extending flange or shoulder member 30 of the end plate 16 according to the present invention eliminating the need to rely on frictional forces generated between spring fingers 28 and the passage 46 to counter the gravity loading of the bearing retaining means 26. With particular reference to FIG. 3, it can be seen that each passage 62 preferably is of an arcuate section with an arc length at least equal to and preferably well in excess of the arc length of one of the spring fingers 28. Passages 62 could also comprise generally rectangular sections positioned along chords of a circle having a diameter approximately equal to the diameter of the bearing retaining means 26 since the resilient fingers can be provided with sufficient flexing capability to accept a radially directed surface 64 so defined. Depending on the relative axial lengths and placements, the spring fingers 28 can also be provided with greater or lesser axial length to engage the radial surface 64 while properly confining the bearing means 56.

Figure 4:
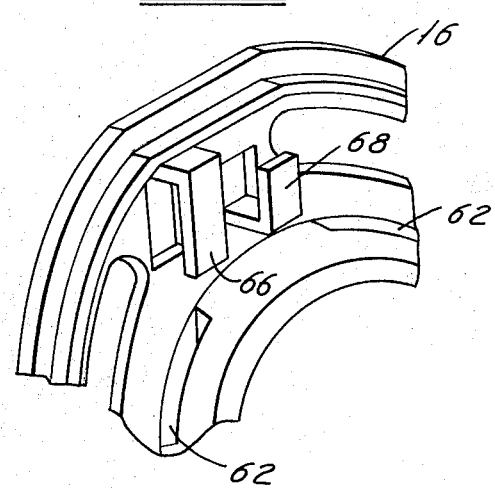
FIG. 4 illustrates a fragmentary view of a portion of the end plate according to the present invention.

Referring now to FIGS. 3 and 4, integrally molded wire retaining clips 66 and 68 are illustrated. These clips 66 and 68 are comprised of oppositely directed L-shaped segments which are circumferentially spaced apart to receive a brush lead wire 70 and to retain the lead to prevent it from wandering, migrating or otherwise moving into the brush commutator interface. The lead wire 70 may be inserted into the clips by forming an S-bend in the wire, placing the wire between the clips and straightening the wire so that it passes under each clip 66 and 68.

Referring now to FIGS. 1, 2, 3 and 4, the dynamoelectric machine using the end plate of the instant invention may be assembled as follows. Bearing structure 56 may be inserted into the passage 46 of the end plate 16 and the bearing retaining means 26 may be inserted immediately behind it to a depth that the fingers 28 engage the radially directed edges 64 of the channels 62. End plate 16 may then be placed in a flat fixture so that the axis of the passage 46 is in the vertical and the armature 14 may be inserted within the passage 46. Brushes 52 may then be inserted into the channels 50 of the brush retaining means 48 by merely inserting them through the radially outward opening of the channel or passage 50 and inserting behind them the requisite biasing means and locating structure. Housing 12 may then be placed over this assemblage and it may be picked up and rotated manually so that clip means 20 can be pressed over the end plate structure 16 so that the collar 44 surrounds the projecting flange 30 and the end portions of the oppositely directed arms 32 and 34 can engage the slots 40 and 42 provided therefor. This process can also be accomplished through automated assembly techniques.

It can be seen that the instant invention readily accomplishes its stated objectives. End plate structure 16 may be provided as a unitary molded plastic structure with integral brush retaining means and lead wire retention means. By providing the generally axially extending, radially spaced, and circumferentially equidistantly disposed channels 62 to intercept the main passage 46 in the vicinity of the bearing retaining means, a discontinuous radially directed surface is provided for the spring fingers 28 of the bearing retention means 26 to forceably grip. Clip means 20 provided in surrounding relationship to an extending flange or shoulder member 30 in cooperation with the axially extending ears 22 received within slots 24 provided therefor in housing 12 couples end plate 16 to the housing 12 and further provides for centrally located support to receive the weight of the armature 14 in the event that the dynamoelectric machine 10 is mounted with the axis of rotation of armature 14 at or near the vertical. Furthermore, the wire retention means 66 and 68 may be conveniently molded as a portion of the end plate 16 during its formation process and will operate to receive any brush lead wires and prevent them from inadvertently entering the brush commutator interface thereby eliminating a further possible source of failure.

What I claim is:

1. A dynamoelectric machine bearing retaining end plate structure capable of axially supporting the weight loading of the armature assembly comprising:
   a unitary plastic end plate housing having a first passage extending therethrough,
   a plurality of generally axially extending passages substantially equidistantly spaced about said first passage and arranged to intercept said first passage, said axially extending passages including radial end wall portions intercepting said first passage,
   bearing means within said first passage, and
   retainer means having a plurality of resilient extending fingers compressively confining said bearing means within said first passage, said resilient fingers operative to engage said radial end wall portions whereby the axial loading of said bearing means will be transferred to said end wall portions.

2. The structure of claim 1 wherein said generally axially extending passages comprise arcuate shaped channels having arc lengths substantially in excess of the arc length of one of said retainer means fingers.

3. A dynamoelectric machine bearing retaining end plate structure capable of axially supporting the weight loading of the armature assembly comprising:
   a unitary plastic end plate housing having a first passage extending therethrough and an axially extending flange;
   a plurality of generally axially extending passages substantially equidistantly spaced about said first passage and arranged to intercept said first passage, said axially extending passages including radial end wall portions intercepting said first passage;
   bearing means within said first passage;
   retainer means having a plurality of resilient extending fingers compressively confining said bearing means within said first passage, said resilient fingers operative to engage said radial end wall portions whereby the axial loading of said bearing means will be transferred to said end wall portions; and
   resilient clip means having a first substantially circular segment and a plurality of resilient, equidistantly spaced, extending arm portions operative to confine the end plate within the housing of a dynamoelectric machine.

4. The combination of claim 3 wherein the end plate includes an axially extending flange and said resilient clip means circular segment and said end plate extending flange are cooperative to centrally support and couple the end plate to a dynamoelectric machine housing.

5. In a unitary plastic bearing retaining and plate of a dynamoelectric machine operated with a substantially vertical axis of rotation of the armature wherein the bearing is retained between a retaining means having a plurality of resilient fingers for gripping the side wall of an axially extending passage formed through the end plate and a shoulder formed in the passage, the improvement comprising:
   means forming a plurality of passages extending from the armature side of the end plate and spaced from the axis of the axial passage to intersect the axial passage in the vicinity of the retaining means, each of said plurality of passages terminating in a radially extending end wall portion defining a discontinuous circumferentially extending ridge for receiving at least a portion of the extending resilient fingers.

6. The end plate of claim 6 wherein the plurality of passages are arranged to be substantially parallel to the axis of rotation and have arcuate cross sections.

7. A dynamoelectric machine bearing retaining end plate structure capable of axially supporting the weight loading of the armature assembly comprising:

a unitary plastic end plate housing having a first passage extending therethrough;

a plurality of generally axially extending passages substantially equidistantly spaced about said first passage and arranged to intercept said first passage, said axially extending passages including radial end wall portions intercepting said first passage;

bearing means within said first passage; and retainer means having a plurality of resilient extending fingers compressively confining said bearing means within said first passage, said resilient fingers operative to engage said radial end wall portions whereby the axial loading of said bearing means will be transferred to said end wall portions;

said end plate housing including a pair of opposed L-shaped wire retaining clip members operative to prevent migration of interiorly placed wires into the brush commutator interface.

8. In a unitary plastic bearing retaining end plate of a dynamoelectric machine operated with a substantially vertical axis of rotation of the armature wherein the bearing is retained between a retaining means having a plurality of resilient fingers for gripping the side wall of an axially extending passage formed through the end plate and a shoulder formed in the passage, the improvement comprising:

means forming a plurality of passages extending from the armature side of the end plate and spaced from the axis of the axial passage to intersect the axial passage in the vicinity of the retaining means, each of said plurality of passages terminating in a radially extending end wall portion defining a discontinuous circumferentially extending ridge for receiving at least a portion of the extending resilient fingers, the plurality of passages being arranged to be substantially parallel to the axis of rotation and having arcuate cross sections, the arc length of an arcuate cross section being larger than the arc length of one resilient finger.

\* \* \* \* \*

UNITED STATES PATENT OFFICE
CERTIFICATE OF CORRECTION

PATENT NO. : 3,794,869
DATED : February 26, 1974
INVENTOR(S) : Theodore G. Apostoleris It is certified that error appears in the above-identified patent and that said Letters Patent are hereby corrected as shown below:

Column 6, Claim 5, line 1, change "and" to --end--.

Column 6, Claim 6, line 1 after "Claim" change "6" to

--5--.

Signed and Sealed this eighth Day of June 1976

[SEAL]

Attest:

RUTH C. MASON
Attesting Officer

C. MARSHALL DANN
Commissioner of Patents and Trademarks